United States Patent
Ruiz Altamirano et al.

(10) Patent No.: US 10,628,334 B2
(45) Date of Patent: Apr. 21, 2020

(54) SYSTEM AND METHOD TO PROTECT DIGITAL CONTENT ON EXTERNAL STORAGE

(71) Applicant: McAfee, LLC, Santa Clara, CA (US)

(72) Inventors: Fernando Ruiz Altamirano, Beaverton, OR (US); German Lancioni, San Jose, CA (US)

(73) Assignee: McAfee, LLC, Santa Clara, CA (US)

( * ) Notice: Subject to any disclaimer, the term of this patent is extended or adjusted under 35 U.S.C. 154(b) by 155 days.

(21) Appl. No.: 15/858,718

(22) Filed: Dec. 29, 2017

(65) Prior Publication Data

US 2018/0253388 A1 Sep. 6, 2018

Related U.S. Application Data

(60) Provisional application No. 62/467,661, filed on Mar. 6, 2017.

(51) Int. Cl.
*H04L 29/06* (2006.01)
*G06F 12/14* (2006.01)
*G06F 3/06* (2006.01)
*G06F 21/60* (2013.01)
*G06F 21/62* (2013.01)

(52) U.S. Cl.
CPC .......... *G06F 12/1408* (2013.01); *G06F 3/062* (2013.01); *G06F 3/0622* (2013.01); *G06F 3/0637* (2013.01); *G06F 3/0659* (2013.01); *G06F 3/0679* (2013.01); *G06F 3/0688* (2013.01); *G06F 12/1458* (2013.01); *G06F 21/602* (2013.01); *G06F 21/6209* (2013.01); *G06F 2212/1052* (2013.01); *G06F 2212/171* (2013.01); *G06F 2212/2022* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,433,895 | B1 * | 4/2013 | Sobel | H04L 63/0442 380/282 |
| 9,069,933 | B1 * | 6/2015 | August | G06F 21/6218 |
| 2004/0054863 | A1 * | 3/2004 | Harada | G06F 21/10 711/164 |
| 2007/0045417 | A1 * | 3/2007 | Tsai | G06K 7/0021 235/441 |
| 2007/0239929 | A1 * | 10/2007 | Chen | G06F 13/385 711/103 |
| 2008/0209544 | A1 * | 8/2008 | Kempka | G06F 21/445 726/17 |

(Continued)

OTHER PUBLICATIONS

Toshiba to Implement "Eyefi Connected" Features in Next Generation FlashAir, Aug. 23, 2016, 2 pages.

*Primary Examiner* — Malcolm Cribbs
(74) *Attorney, Agent, or Firm* — Hanley, Flight & Zimmerman, LLC

(57) ABSTRACT

An adapter is configured to sit between an external storage device and another device configured to read and write to the external storage device. The adapter encrypts data written to the external storage device and decrypts data read from the external device. The adapter determines whether to allow reading from or writing to the external storage device responsive to instructions received from an authenticating device.

20 Claims, 8 Drawing Sheets

(56) References Cited

U.S. PATENT DOCUMENTS

| | | | |
|---|---|---|---|
| 2008/0229015 A1* | 9/2008 | Kim | G06F 12/1425 |
| | | | 711/115 |
| 2008/0307522 A1* | 12/2008 | Shoji | G06F 3/0622 |
| | | | 726/21 |
| 2009/0239468 A1* | 9/2009 | He | H04L 63/0853 |
| | | | 455/41.2 |
| 2010/0186084 A1* | 7/2010 | Hamid | G06F 12/1458 |
| | | | 726/19 |
| 2010/0248775 A1* | 9/2010 | Mikkelsen | H04M 1/0254 |
| | | | 455/556.1 |
| 2011/0231672 A1* | 9/2011 | Idani | G06F 21/6218 |
| | | | 713/189 |
| 2012/0102326 A1* | 4/2012 | Palekar | G06F 21/604 |
| | | | 713/168 |
| 2012/0260100 A1* | 10/2012 | Applegate | G06F 21/34 |
| | | | 713/182 |
| 2013/0282928 A1* | 10/2013 | Winestein | G06F 3/0659 |
| | | | 710/5 |
| 2016/0148022 A1* | 5/2016 | Bakke | G06F 21/44 |
| 2016/0294872 A1* | 10/2016 | Walline | H04L 63/20 |

* cited by examiner

SYSTEM AND METHOD TO PROTECT DIGITAL CONTENT ON EXTERNAL STORAGE

TECHNICAL FIELD

Embodiments described herein generally relate to the field of data protection, and in particular to techniques for protecting digital content on external storage devices.

BACKGROUND ART

Many devices use external storage devices to access and store data. For example, various photo/video cameras, appliances, smartphones, embedded systems, etc. store data (e.g., digital photographs, videos, etc.) on removable storage devices, such as Secure Digital (SD) cards (e.g., standard or micro SD cards).

However, files stored in an SD card are often not protected. Further, if the files are protected, managing access authorization to the files may be difficult or limit usability of the SD card. For example, photos taken with a digital camera and stored on an SD card in an unencrypted format are susceptible to data breach or disclosure if the SD card is accessed without author approval. On the other hand, if the digital camera encrypts the photos, then a device (e.g., a personal computer) must execute specialized software to unencrypt the content, creating a strict dependency between the devices and limiting usability of the SD card.

SD cards support a variety of security options. For example, referring to FIG. 1, an SD card 100 may include a read-only switch. When the read-only switch is placed in position 110A, the memory on the SD card can be written to or modified. When the read-only switch is placed in position 110B, the SD card is locked, and the data is read-only. The read-only switch may not prevent unauthorized access to the files stored in a SD card because the read-only switch does not prevent reads, and an unauthorized user can change the position of the read-only switch.

SD cards are designed to support "Content Protection for Recordable Media" for digital rights management (DRM) content-protection. However, this is limited to those buying a license from the SD Association, as the design is not publicly available. This may be more suitable for multimedia content distribution companies (music, video, software, etc.) than for consumers.

Some devices take advantage of proprietary solutions to protect the data. For example, Windows Phone used to set a device-specific key in the protected area of the SD card to take "ownership" of the memory card. With the key set, the card would not work with another phone. This solution prevents an authorized user from manipulating the memory card from different devices (e.g., a PC, a smartphone, an IP/digital camera, or an embedded system).

In some implementations, a 16 byte password is used to control access to the SD card, but this is an ON/OFF solution which allows entire access (read/write/delete) once the password is provided. There may not be a way to use this password for just some of the files in the memory, or to customize the password based on the device. Once one has the password, information can be accessed in any device, without limitations.

In some implementations, devices implement their own strategy to protect files stored on an SD card (e.g., proprietary encryption). However, this requires either using the SD card only on that device (eliminating the possibility to manipulate the memory card from a different device) or installing proprietary software in different devices (e.g., in the PC). This may be inconvenient and does not solve the problem for all the devices in the market.

Accordingly, known solutions may be insufficient or inconvenient for a user.

DESCRIPTION OF EMBODIMENTS

Figure 1:
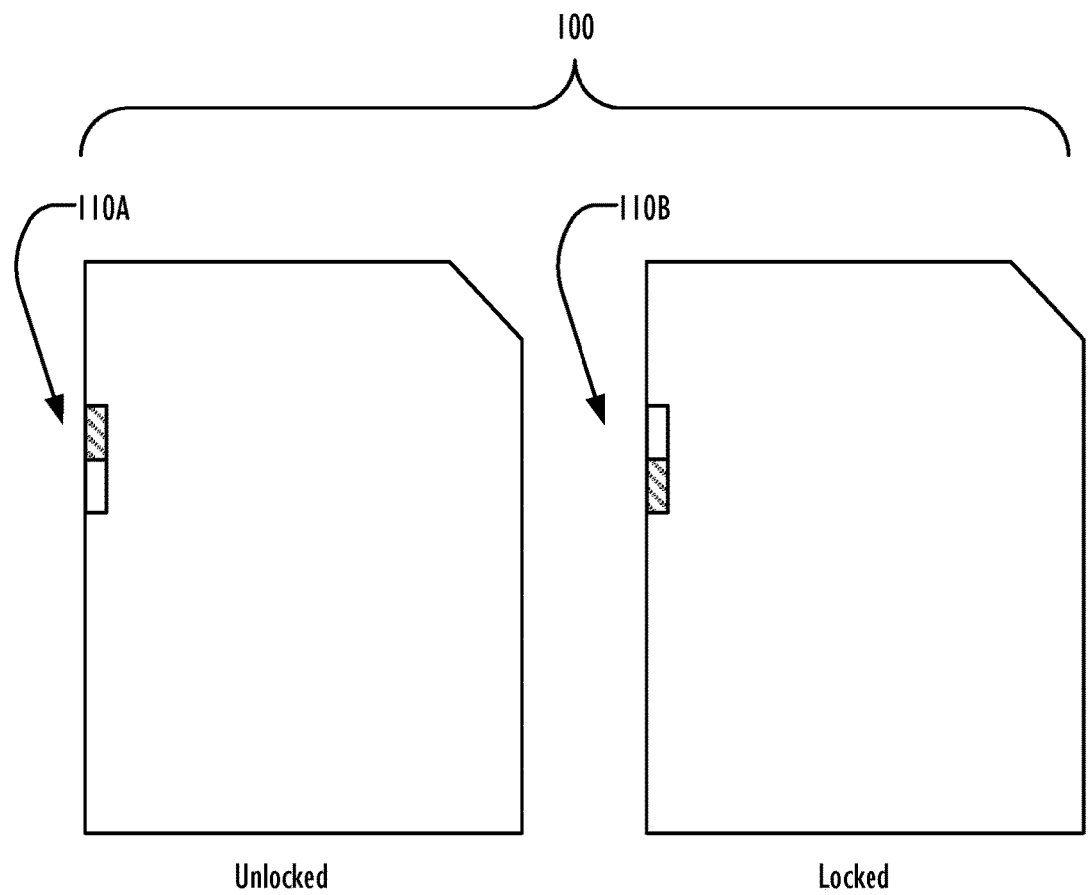
FIG. 1 is a block diagram illustrating an SD card according to the prior art.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

Embodiments disclosed below provide a mechanism to protect digital content stored on memory devices (e.g., SD™ cards), regardless of the device characteristics and security capabilities. (SD is a trademark of SD-3C LLC.) The disclosed embodiments add a layer of access control to data in an external memory (e.g., SD or Micro SD) device by using a hardware-based encryption solution embedded in the memory itself or in a memory adapter. The memory or memory adapter allows an authorized device to access the memory based on an owner's criteria. In some examples, the owner's criteria is set through remote administration using a web interface or mobile app that is available once the memory or memory adapter is energized in a device. Examples of devices that may be authorized to access the memory include a digital camera, a tablet, a smartphone, an appliance, an Internet of things (IoT) device in general. Accessing the memory may include decrypting and reading data from the memory and/or encrypting and writing data to the memory. In some implementations, the memory or memory adapter is configured to not allow devices access to any data stored in the memory by default. The default may be overridden by the owner's criteria.

Embodiments disclosed herein provide multiple benefits. For example, the disclosed embodiments provide a technique to apply security and file access control seamlessly to any device independent of the device's security capabilities by protecting and managing access control to the files stored in the memory card. Accordingly, the disclosed embodiments enable transparent secure data storage on authorized devices. Further, the disclosed embodiments support different levels of access authorization, customized per device, file, session time, etc. Further, the disclosed embodiments enable devices without specialized security software to access secure data stored on a memory device. Accordingly, the disclosed embodiments enable improved security of devices, such as IoT devices, that use external storage devices. In addition, the disclosed embodiments enable convenient configuration of the memory adapter (e.g., via an application executing on a mobile device). Accordingly, the disclosed embodiments enable quick setup/administration over Wi-Fi® networks and a smartphone application (WI-FI is a registered trademark of Wi-Fi Alliance). Further, the disclosed embodiments enable remote control of memory access. In addition, the disclosed memory adapter can be reused by different users for different memory cards. Further, the memory adapter can be updated over time by upgrading the adapter firmware. For example, such an update may include enhanced encryption mechanisms.

Figure 2:
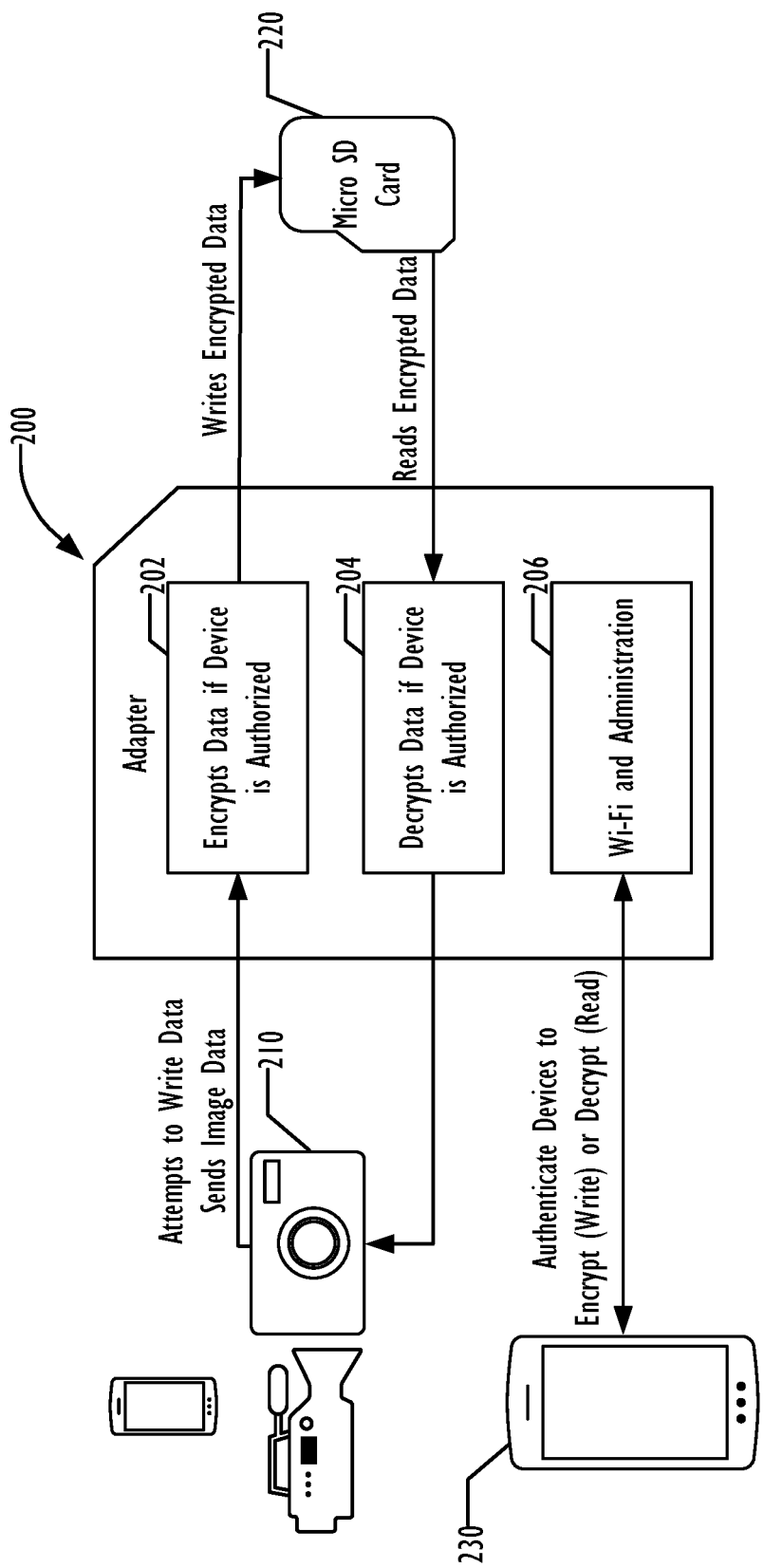
FIG. 2 is a block diagram illustrating an overall view of use of an adapter for secure control of an external storage device according to one embodiment.

FIG. 2 is a block diagram illustrating use of an adapter 200 for securely communicating with a memory device (e.g., an SD card) according to one embodiment. In the illustrated embodiment, the adapter 200 is coupled to a camera 210 and to a micro SD card 220. The adapter is further configured to communicate (e.g., wirelessly) with an authenticating device 230. It should be noted that in other examples, the adapter 200 may be coupled to a different device (e.g., a camera, a smartphone, an Internet of things device, another type of computing device, or a combination thereof) rather than the camera 210. Further, in alternative embodiments, the adapter 200 corresponds to a memory device, such as an SD card, rather than an adapter that communicates with another memory device.

The adapter 200 includes logical blocks 202-206. The logical blocks 202-206 may correspond to dedicated hardware, software executed on one or more processors of the adapter 200, or a combination thereof.

In response to receiving a request to write data to the micro SD card 220 from the camera 210, the adapter 200 determines whether the camera 210 is authorized to write to the micro SD card 220. In some implementations, the adapter 200 includes an onboard memory device (not shown) configured to store authorization data. The adapter 200 (e.g., a processor of the adapter 200) accesses the onboard memory device to determine whether the camera 210 is authorized use the adapter 200 to encrypt data. The authorization data stored in the onboard memory of the adapter 200 may include a session-based authorization, a time-based authorization, a device identifier-based authorization, or a combination thereof. Each authorization grants permission to encrypt data written to the micro SD card 220, decrypt data stored on the micro SD card 220, or both. A session-based authorization indicates that a device currently powering the adapter 200 (e.g., the camera 210) has authorization. A session based authorization may expire once the adapter 200 is powered off (e.g., due to the camera 210 powering down or the adapter 200 being decoupled from the camera 210). A time-based authorization indicates that any device has authorization within a particular authorized time window. An authorized time window may be defined by a specific start and stop time or by a duration and a trigger event. For example, a time-based authorization may indicate access to a memory device is authorized between 7 PM and 8 PM on Nov. 1, 2017 or may indicate that access to the memory device is authorized within 1 hour of a trigger event. The trigger event may correspond to a first memory access (e.g., read or write), to receipt of the authorization data, to connection of the adapter 200 to a device, to another event, or a combination thereof. A device identifier-based authorization indicates that a particular device associated with a particular device identifier has authorization. Device identifiers include, but are not limited to, media access control (MAC) addresses, hardware fingerprints, universally unique identifiers (GUIDs), etc. In some implementations, hashed versions of device identifiers of authorized devices are stored in the onboard memory. Further, an authorization may be a combination of the authorizations listed above. For example, a particular device may have authorization for a particular authorized time window. The authorization data may be set by the authenticating device 230, as described further below. In some examples, a particular authorization may be associated with particular data store on the micro SD card 220. To illustrate, the particular authorization may be associated with a particular file.

In response to the adapter 200 determining that the camera 210 has authorization to encrypt data, the block 202 of adapter 200 encrypts the data received from the camera 210 and writes the encrypted data to micro SD card 220. The block 202 may encrypt the data using one or more encryption algorithms, such as an advanced encryption standard (AES) symmetric encryption algorithm. In some implementations, the block 202 includes a hardware random number generator and firmware executable to perform encryption. The firmware may be updated to update encryption techniques used by the block 202. The hardware random number generator may be an "always on" random number generator.

In response to receiving a request from the camera 210 to read data from the micro SD card 220, the adapter 200 determines whether the camera 210 has authorization to decrypt data stored on the micro SD card 220. For example, the adapter 200 may determine whether the camera 210 has authorization to decrypt based on the authorization data stored in the onboard memory device. In response to the adapter 200 determining that the camera 210 is authorized to decrypt the data, the read request is sent to block 204 of adapter 200. The block 204 decrypts the data from the micro SD card 220 and returns the data to the camera 210. In a particular implementation, the block 204 includes a hardware random number generator and firmware executable to perform decryption. The firmware may be updated to update decryption techniques used by the block 204. The blocks 202, 204 may share common components (e.g., a common hardware random number generator).

The authenticating device 230, illustrated as a smartphone in FIG. 2, communicates with the adapter 200 via the block 206. While illustrated as two separate devices, the authenticating device 230 and the adapter 200 correspond to a single device in some embodiments. The block 206 may include a Wi-Fi interface (or other wireless interface) and logic (e.g., instructions executable by a processor) to communicate with the authenticating device 230 and to update the authorization data. The authenticating device 230 provides a user interface to manage authorizations to read or write data to the micro SD card 220. In some implementations, the user interface is provided by an application (e.g., a mobile application), executing on the authenticating device 230, that is configured to communicate with the adapter 200. In some implementations, the user interface corresponds to a web-based interface. Based on input received from the authenticating device 230, the adapter 200 sets the authorization data.

In some implementations, the application executing on the authenticating device 230 includes additional features. For example, the application may include an authentication feature that requires a user to provide authentication credentials prior to authorizing or denying read/write authorization for a device. The authentication credentials may include biometric input, a password, a security key, another type of credential, or a combination thereof. In some implementations, the application further saves (e.g., in a memory of the authenticating device 230 or in the cloud) a data structure (e.g., a list) identifying each device (e.g., the camera 210) that has connected to the adapter 200. The application may generate a display screen identifying the devices that have connected to the adapter 200 based on the data structure. Further, the application may be configured to generate an alert at the authenticating device 230 in response to receiving an indication from the adapter 200 indicating that the adapter 200 has been coupled to a device (e.g., the camera 210). The alert may be a text alert, an audio alert, a graphical alert, another type of alert, or a combination thereof. Use of the authenticating device 230 is explained further below with reference to FIG. 4.

Thus, the adapter 200 applies encryption (e.g., Advanced Encryption Standard (AES) encryption, a different symmetric key encryption algorithm, an asymmetric key encryption algorithm, etc.) implemented at the hardware level with a built-in random number generator to data stored on the micro SD card 220. Further, the adapter 200 is configured to determine authorization to encrypt/decrypt data stored on the micro SD card 220 based on input received (e.g., via a web interface) from the authenticating device 230. Accordingly, the adapter 200 provides a secure storage solution that is conveniently accessible using a variety of devices that may not execute specialized encryption/decryption software.

Figure 3:
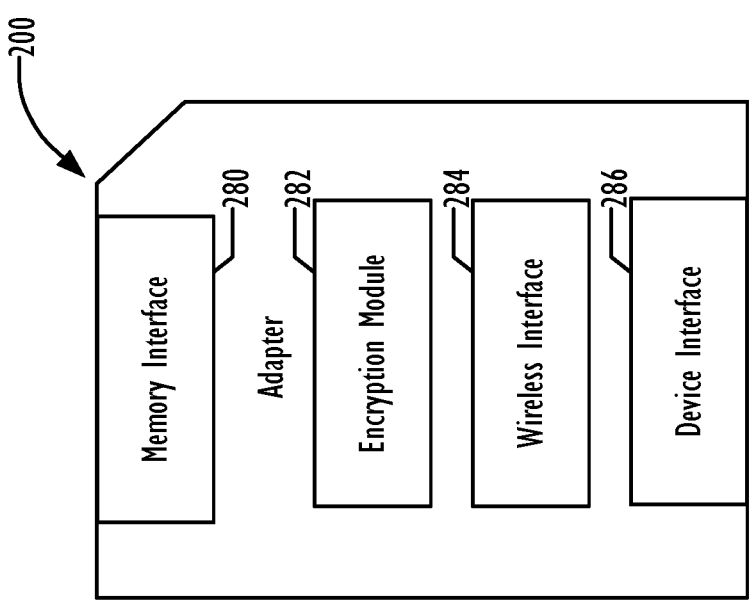
FIG. 3 is a block diagram illustrating the adapter for secure control of the external storage device according to one embodiment.

FIG. 3 is a block diagram illustrating the adapter 200 for securely communicating with a memory device (e.g., SD card) according to one embodiment. As illustrated in FIG. 3, the adapter 200 includes a memory interface 280, an encryption module 282, a wireless adapter 284, and a device interface 286. The memory interface 280 is configured to engage with an external storage device, such as the micro SD card 220. For example, an external storage device may be inserted into the adapter 200 and coupled to the memory interface 280. In a particular implementation, the memory interface 280 corresponds to a micro SD card reader. The memory interface 280 is configured to exchange data between the adapter 200 and the external storage device. Similarly the device interface 286 is configured to engage with a device (e.g., the camera 210) that is adapted to use external memory. For example, the adapter 200 may be inserted into or coupled to communication port, such as an SD card reader, of the camera 210. While illustrated as having a form factor corresponding to an SD card, the adapter 200 may be manufactured in a variety of shapes and sizes. Devices the adapter 200 interact with may include a camera, a personal computer, a game system, etc. The device interface 286 is configured to exchange data between the adapter 200 and the device (e.g., the camera 210). Further, the device interface 286 is configured to receive power from the device (e.g., the camera 210) to power the adapter 200.

The encryption module 282 includes a hardware random number generator, a memory device, and a processor. The processor of the encryption module 282 is configured to determine whether a device engaged with the device interface 286 is authorized to encrypt/decrypt data stored on the external storage device based on authorization data stored in the memory device. The processor is further configured to initiate encryption or decryption of data stored on the external memory device using the hardware random number generator in response to determining that the device is authorized. The memory interface 280, the encryption module 282, and the device interface 286 may be configured to perform the functions of the block 202 and the block 204 of FIG. 2.

The wireless interface 284 may correspond to a Wi-Fi adapter or other type of adapter. The wireless interface 284 is configured to wirelessly exchange data between the adapter 200 and other devices. In particular the wireless interface 284 is configured to receive the authorization data from the authentication device 230. Further, the wireless interface 284 may be configured to receive one or more firmware updates to adjust one or more functions of the adapter 200 (e.g., cryptographic functions). The wireless interface 284 and the encryption module 282 may correspond to the Wi-Fi and administration block 206 of FIG. 2. In some implementations, the adapter 200 includes a wired interface configured to receive the authorization data in addition to or in place of the wireless interface 284. To illustrate, in examples where the authentication device 230 and the camera 210 correspond to a single device, the adapter 200 may receive the authorization information via the device interface 286.

Figure 4:
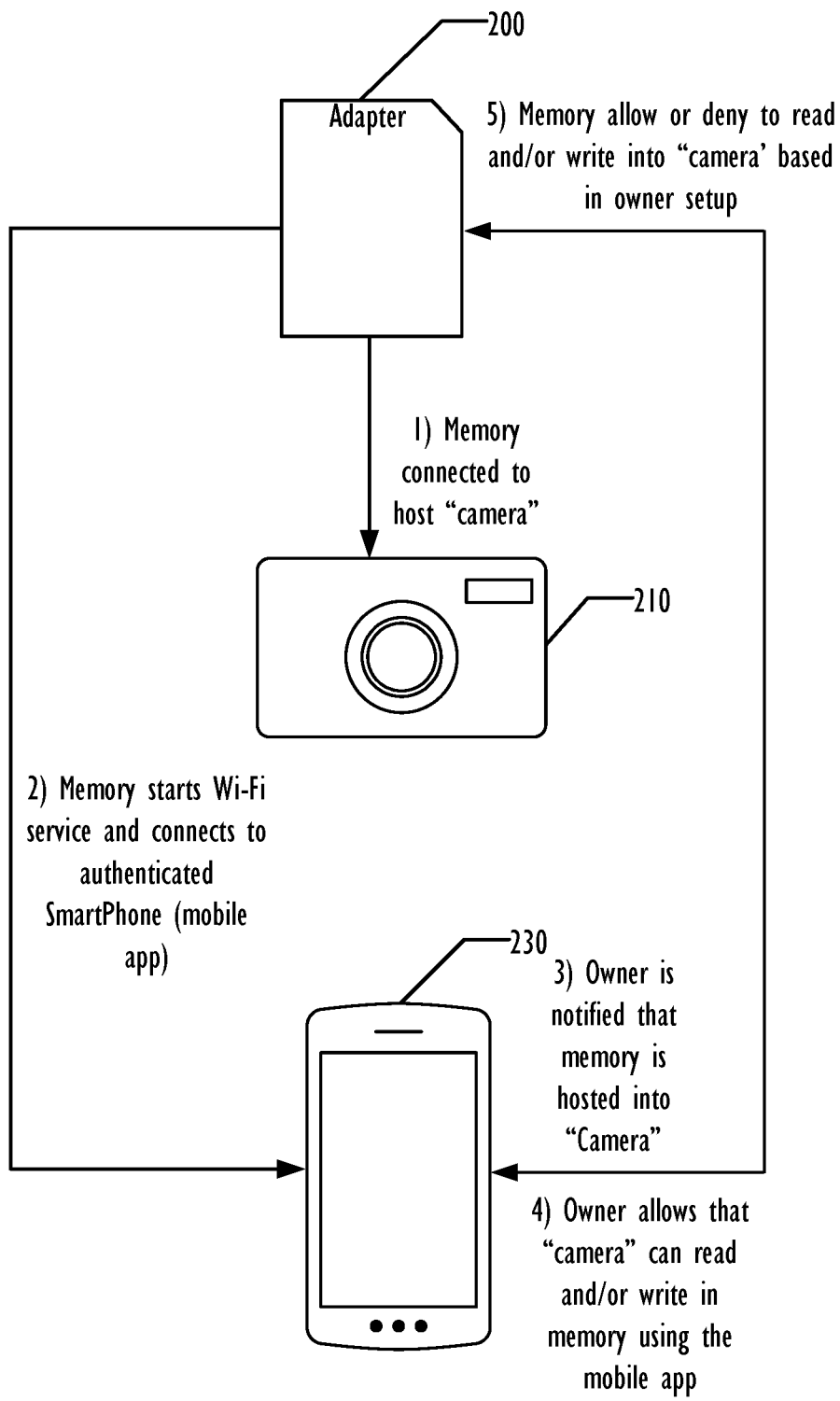
FIG. 4 is a block diagram illustrating a technique for managing an adapter for secure control of an external storage device according to another embodiment.

FIG. 4 is a block diagram illustrating a technique for managing an adapter 200 for secure control of an external storage device according to another embodiment. The example of FIG. 4 illustrates the authenticating device 230 interacting with the adapter 200.

In step 1, the memory or adapter 200 is connected to a host device, such as the camera 210. For example, a user may insert the adapter 200 into a memory slot of the camera 210. In step 2, the adapter 200 starts a Wi-Fi service and connects to an application on the authenticating device 230, such as a mobile app or a smartphone.

In step 3, the owner of the authenticating device 230 is notified that the adapter 200 has been hosted into the camera 210. For example, the application may generate a text alert, an audio alert, a graphical alert, a tactile alert (e.g., by causing the authenticating device 230 to vibrate), or a combination thereof in response to connecting to the adapter 200. In some implementations, the alert identifies the camera 210 by device type, by unique identifier, or by a combination thereof.

In step 4, the owner uses the user interface of the authenticating device 230 to allow camera 210 to access the adapter 200 (and its connected external storage device). For example, the user may select an option to allow session-based access to the adapter 200. In another example, the user may select an option to grant the camera 210 specifically access to the adapter 200. As another example, the user may select an option to grant authorizing access to the adapter 200 for an authorized time window. An access permission may be a combination of session based access, device based access, and time based access. For example, a particular device may be granted access during an authorized time window. Accessing the adapter 200 may include writing data to the external storage device connected to the adapter 200, reading data from the external storage device, executing a program stored on the external storage device, or a combination thereof. In some implementations, execution access corresponds to a combination of read access and write access and is not a distinct access permission. In some implementations, read access, write access, and execution access may be granted separately. To illustrate, a specific device may be granted write access but not read access.

Finally, in step 5, the adapter 200 allows the read or write access to the connected external storage device, such as the micro SD card 220 illustrated in FIG. 2. For example, the adapter 200 may store authorization data based on input from the authenticating device 230. The adapter 200 may whether to enable encryption/decryption for the camera 210 based on the authorization data.

Figure 5:
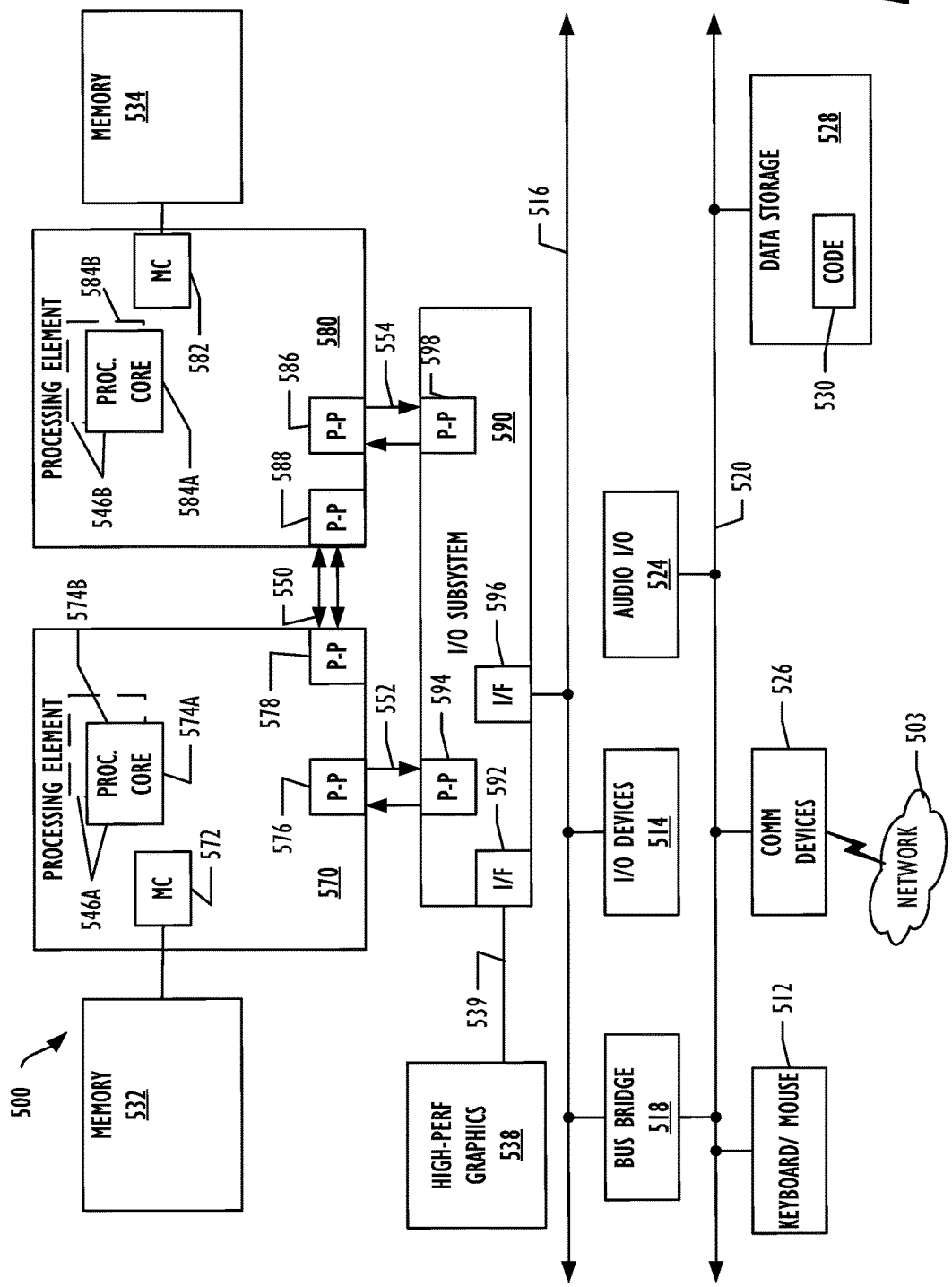
FIGS. 5-6 are block diagrams illustrating a computing device for use with techniques described herein according to two embodiments.

Referring now to FIG. 5, a block diagram illustrates a programmable device 500 that may be used for implementing the techniques described herein in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Figure 6:
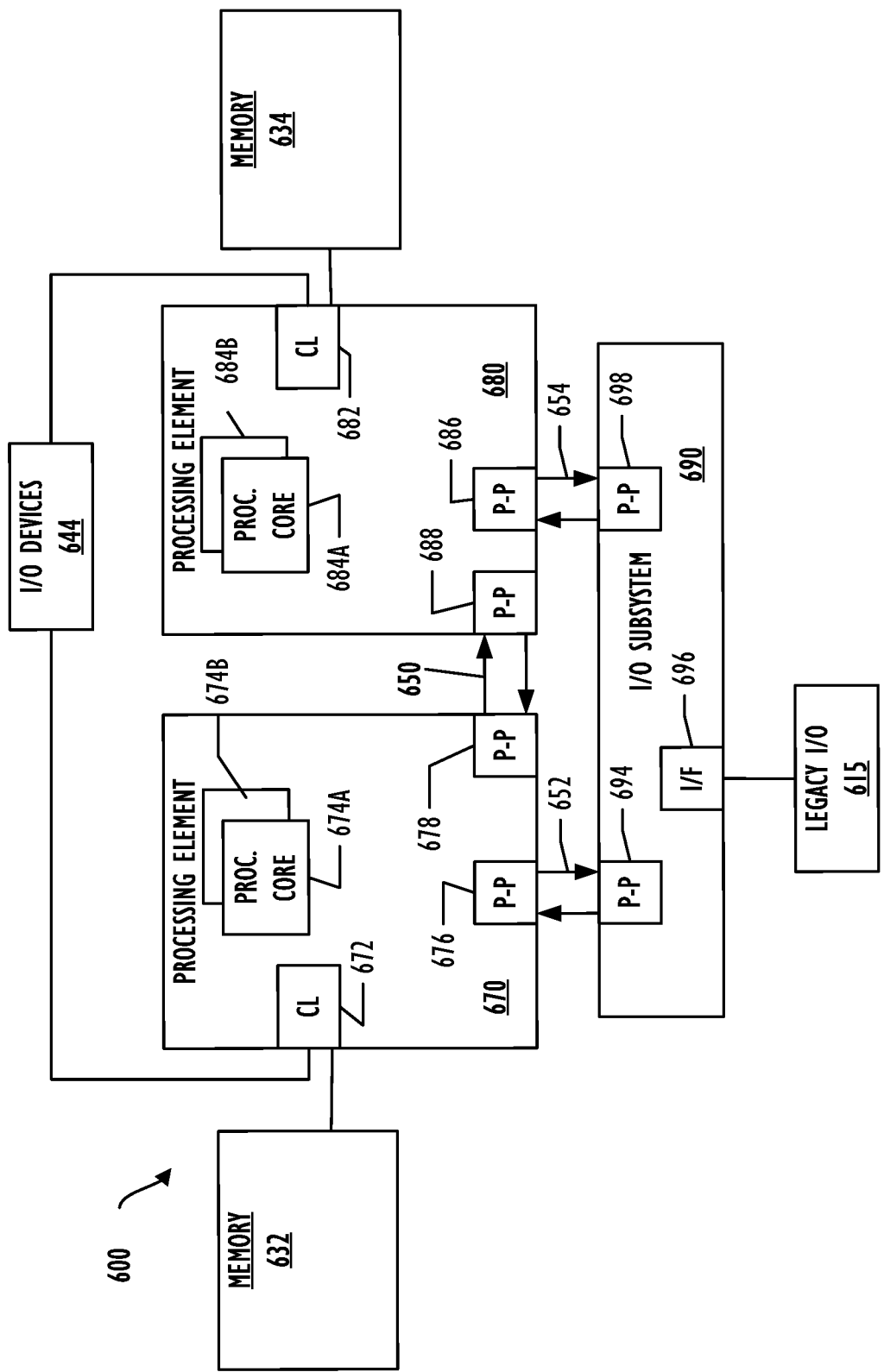

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 6. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

Figure 7:
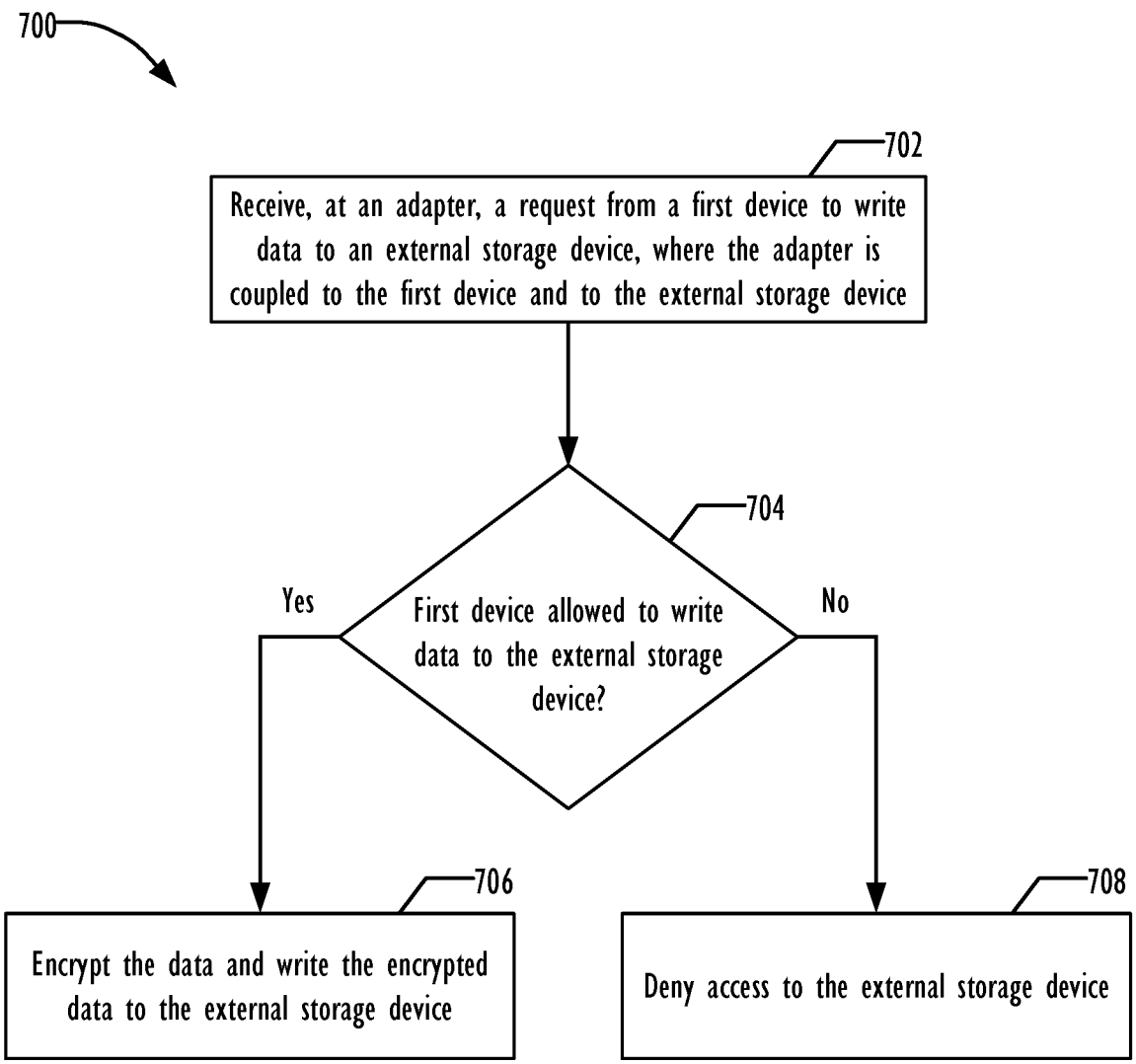
FIG. 7 is a flowchart illustrating a method for controlling write access to an external storage device.

Referring to FIG. 7, a flowchart illustrating a method 700 for controlling write access to an external storage device is shown. The method 700 may be implemented by a computing device, such as the adapter 200, the programmable device 500, or the programmable device 600. The method 700 includes receiving, at an adapter, a request from a first device to write data to an external storage device, where the adapter is coupled to the first device and to the external storage device, at 702. In an illustrative example, the adapter 200 is coupled to the camera 210 via the device interface 286. The adapter 200 is further coupled to the micro SD card 220 via the memory interface 280. The adapter 200 receives a request to write data to the micro SD card 220 from the camera 210 via the device interface 286.

The method 700 further includes determining whether the first device is allowed to write data to the external storage device, at 704. In an illustrative example, the adapter 200 determines whether the camera 210 has authorization to write data to the micro SD card 220. For example, the adapter 200 may access an embedded memory of the adapter 200 to determine whether authorization data stored in the memory indicates the camera 210 is allowed to write data to the micro SD card 220.

In response to determining that the first device is allowed to write data to the external storage device, the method 700 includes encrypting the data and writing the encrypted data to the external storage device, at 706. In an illustrative example, in response to determining that the authorization data stored in the memory of the adapter 200 indicates the camera 210 is authorized to write data to the micro SD card 220, the adapter 200 utilizes the encryption module 282 to encrypt the data from the camera 210. The adapter 200 then writes the encrypted data to the micro SD card 220 via the memory interface 280. The adapter 200 may determine that the camera 210 is authorized in response to the authorization data specifically identifying the camera 210 as a device with write access. In another example, the adapter 200 may determine that the camera 210 is authorized in response to the authorization data identifying an authorized time window, during which the request to write was received at the adapter 200, as authorized for writing. In another example, the adapter 200 may determine that the camera 210 is authorized in response to the authorization data identifying a session, during which the request to write was received at the adapter 200, as authorized for writing. A session may be defined based on connection to a device. For example, a particular session may begin when the adapter 200 is connected to a device and end when the adapter 200 is disconnected from the device.

In response to determining that the first device is not allowed to write data to the external storage device, the method 700 denying access to the external storage device, at 708. In an illustrative example, the adapter 200 denies the camera 210 access to the micro SD card 220. In some examples, the adapter 200 further sends a message to the authenticating device 230 that an unauthorized device has attempted to write to the micro SD card 220. In addition or in the alternative, the adapter 200 may store data indicating that an unauthorized device has attempted to write to the micro SD card 220.

Thus, the method 700 enables control of write access to an external storage device. The method 700 may conveniently be used with a variety of devices that do not have specialized encryption/decryption software installed. Accordingly, the method 700 may provide a more convenient technique for securing data on external storage devices configured to operate with a variety of devices.

Figure 8:
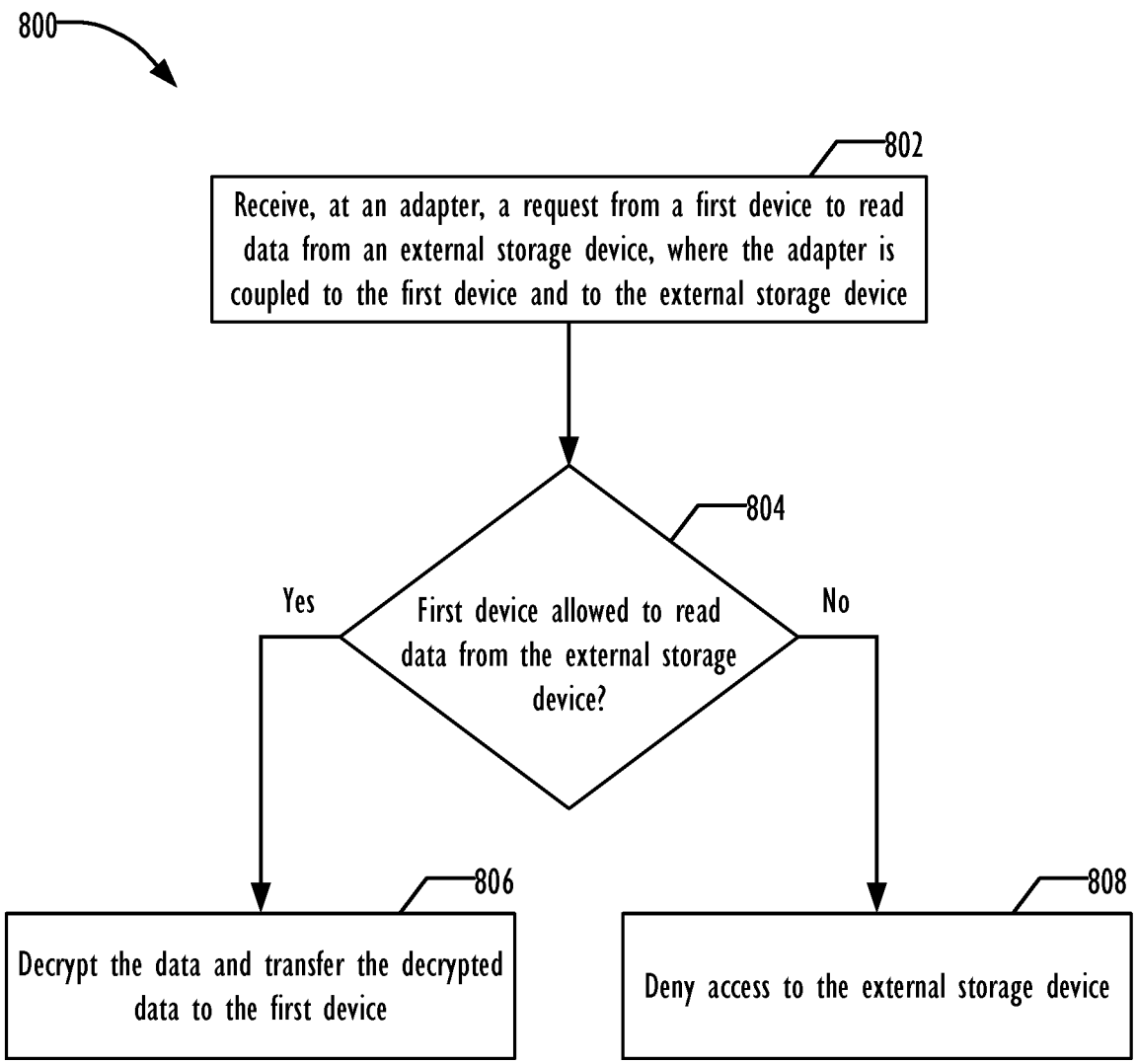
FIG. 8 is a flowchart illustrating a method for controlling read access to an external storage device.

Referring to FIG. 8, a flowchart illustrating a method 800 for controlling read access to an external storage device is shown. The method 800 may be implemented by a computing device, such as the adapter 200, the programmable device 500, or the programmable device 600. The method 800 includes receiving, at an adapter, a request from a first device to read data from an external storage device, where the adapter is coupled to the first device and to the external storage device, at 802. In an illustrative example, the adapter 200 is coupled to the camera 210 via the device interface 286. The adapter 200 is further coupled to the micro SD card 220 via the memory interface 280. The adapter 200 receives a request to read data from the micro SD card 220 from the camera 210 via the device interface 286.

The method 800 further includes determining whether the first device is allowed to read data from the external storage device, at 804. In an illustrative example, the adapter 200 determines whether the camera 210 has authorization to write data to the micro SD card 220. For example, the adapter 200 may access an embedded memory of the adapter 200 to determine whether authorization data stored in the memory indicates the camera 210 is allowed to read data from the micro SD card 220.

In response to determining that the first device is allowed to read data from the external storage device, the method 800 includes decrypting the data and transferring the decrypted data to the first device, at 806. In an illustrative example, in response to determining that the authorization data stored in the memory of the adapter 200 indicates the camera 210 is authorized to read data from the micro SD card 220, the adapter 200 utilizes the encryption module 282 to decrypt the data from the camera 210. The adapter 200 then transfers the decrypted data to the micro SD card 220 via the memory interface 280. The adapter 200 may determine that the camera 210 is authorized in response to the authorization data specifically identifying the camera 210 as a device with read access. In another example, the adapter 200 may determine that the camera 210 is authorized in response to the authorization data identifying an authorized time window, during which the request to read was received at the adapter 200, as authorized for reading. In another example, the adapter 200 may determine that the camera 210 is authorized in response to the authorization data identifying a session, during which the request to read was received at the adapter 200, as authorized for reading.

In response to determining that the first device is not allowed to read data to the external storage device, the method 800 denying access to the external storage device, at 808. In an illustrative example, the adapter 200 denies the camera 210 access to the micro SD card 220. In some examples, the adapter 200 further sends a message to the authenticating device 230 that an unauthorized device has attempted to read from the micro SD card 220. In addition or in the alternative, the adapter 200 may store data indicating that an unauthorized device has attempted to read from the micro SD card 220.

Thus, the method 800 enables control of read access to an external storage device. The method 800 may conveniently be used with a variety of devices that do not have specialized encryption/decryption software installed. Accordingly, the method 800 may provide a more convenient technique for securing data on external storage devices configured to operate with a variety of devices.

Embodiments employing these techniques can be released as a standalone consumer product to enhance security capabilities of several IoT and legacy devices. In addition to protecting access to data stored on SD cards and other external devices, these techniques may be used to provide secure chain of custody control for areas such as computer forensic. For example, Crime Scene Investigation (CSI) teams are required to take photographs of evidence and handle the access to that data in a very secure manner. Using the techniques disclosed herein, the CSI team can control and secure the evidence and avoid photographs leaks during a crime investigation case.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An adapter to protect content on an external storage device, the adapter comprising:
a first interface to communicate with a first device;
a second interface to communicate with the external storage device;
a wireless interface to communicate with an authentication device different from the external storage device and the first device; and
circuitry to:
connect to an application of the authentication device via the wireless interface in response to a request from the first device via the first interface to write data to the external storage device, the application to provide authorization data to the adapter via the wireless interface;
determine, based on the authorization data, whether the first device is allowed to write the data to the external storage device; and
encrypt the data and write the encrypted data to the external storage device via the second interface responsive to a determination that the first device is allowed to write the data to the external storage device.

2. The adapter of claim 1, wherein the circuitry is further to:
determine whether the first device is allowed to read second encrypted data from the external storage device in response to a request from the first device to read the second encrypted data from the external storage device; and
read the second encrypted data from the external storage device, decrypt the second encrypted data to obtain decrypted data, and transmit the decrypted data to the first device responsive to a determination that the first device is allowed to read the second encrypted data from the external storage device.

3. The adapter of claim 1, wherein the authorization data from the application of the authenticating device is to indicate whether the first device is allowed to read from the external storage device or write to the external storage device.

4. The adapter of claim 3, wherein the authorization data from the authenticating device is to identify a session-based authorization.

5. The adapter of claim 3, wherein the authorization data from the authenticating device is to identify the first device as an authorized device.

6. The adapter of claim 5, wherein the authorization data from the authenticating device includes a hardware fingerprint associated with the first device.

7. The adapter of claim 3, wherein the authorization data from the authenticating device is to identify an authorized time window.

8. The adapter of claim 1, wherein the first device includes a camera, a smartphone, an Internet of things device, another type of computing device, or a combination thereof.

9. The adapter of claim 1, wherein the external storage device includes a secure digital card.

10. A computer readable storage device comprising computer readable instructions that, when executed by one or more processors of an adapter, cause the one or more processors of the adapter to at least:
connect to an application of an authentication device via a wireless interface in response to a request from a first device to write data to an external storage device, the adapter to communicate with the first device and the external storage device, the application of the authentication device to provide authorization data to the adapter via the wireless interface, the authentication device different from the external storage device and the first device;
determine, based on the authorization data, whether the first device is allowed to write the data to the external storage device; and
encrypt the data and write the encrypted data to the external storage device responsive to a determination that the first device is allowed to write the data to the external storage device.

11. The computer readable storage device of claim 10, wherein the instructions cause the one or more processors to:
determine whether the first device is allowed to read second encrypted data from the external storage device in response to a second request from the first device; and
read the second encrypted data from the external storage device, decrypt the second encrypted data to obtain decrypted data, and transmit the decrypted data to the first device responsive to a determination that the first device is allowed to read the second encrypted data from the external storage device.

12. The computer readable storage device of claim 10, wherein the authorization data from the application of the authenticating device is to indicate whether the first device is allowed to read from the external storage device or write to the external storage device.

13. The computer readable storage device of claim 12, wherein the authorization data from the authenticating device is to identify a session based authorization.

14. The computer readable storage device of claim 12, wherein the authorization data from the authenticating device is to identify the first device as an authorized device.

15. The computer readable storage device of claim 14, wherein the authorization data from the authenticating device includes a hardware fingerprint associated with the first device.

16. The computer readable storage device of claim 12, wherein the authorization data from the authenticating device is to identify an authorized time window.

17. A method to control access to data, the method comprising:
connecting to an application of an authentication device via a wireless interface in response to a request from a first device to write data to an external storage device, the request received at an adapter to communicate with the first device and the external storage device, the application of the authentication device to provide authorization data to the adapter via the wireless interface, the authentication device different from the external storage device and the first device;
determining, based on the authorization data, whether the first device is allowed to write the data to the external storage device; and
encrypting the data and writing the encrypted data to the external storage device responsive to a determination that the first device is allowed to write the data to the external storage device.

18. The method of claim 17, further including:
determining whether the first device is allowed to read second encrypted data from the external storage device in response to a second request from the first device; and
reading the second encrypted data from the external storage device, decrypting the second encrypted data to obtain decrypted data, and transmitting the decrypted data to the first device responsive to a determination that the first device is allowed to read the second encrypted data from the external storage device.

19. The method of claim 17, wherein the authorization data from the application of the authenticating device indicates whether the first device is allowed to read from the external storage device or write to the external storage device.

20. The method of claim 19, wherein the authorization data from the authenticating device identifies a session-based authorization.

* * * * *